United States Patent
Geibel et al.

(10) Patent No.: US 11,002,344 B2
(45) Date of Patent: May 11, 2021

(54) VALVE UNIT WITH CARRIER PLATE AND VALVE BODY

(71) Applicant: iwis motorsysteme GmbH & Co. KG, Munich (DE)

(72) Inventors: Henning Geibel, Wessling (DE); Renzo Perissinotto, Dachau (DE)

(73) Assignee: IWIS MOTORSYSTEME GMBH & CO. KG, Munich (DE)

( * ) Notice: Subject to any disclaimer, the term of this patent is extended or adjusted under 35 U.S.C. 154(b) by 599 days.

(21) Appl. No.: 15/879,386

(22) Filed: Jan. 24, 2018

(65) Prior Publication Data

US 2018/0238424 A1    Aug. 23, 2018

(30) Foreign Application Priority Data

Feb. 21, 2017 (DE) ...................... 10 2017 103 534.6

(51) Int. Cl.
*F16H 7/08* (2006.01)
*F16K 15/04* (2006.01)

(52) U.S. Cl.
CPC ......... *F16H 7/0848* (2013.01); *F16K 15/044* (2013.01); *F16H 2007/0812* (2013.01); *F16H 2007/0859* (2013.01)

(58) Field of Classification Search
CPC ..... F16H 2007/0812; F16H 2007/0859; F16H 7/0848

(Continued)

(56) References Cited

U.S. PATENT DOCUMENTS 5,993,341 A * 11/1999 Anderson ................. F16H 7/08
  137/543.17
7,404,776 B2 * 7/2008 Yoshida ............... F16H 7/0836
  474/110

(Continued)

FOREIGN PATENT DOCUMENTS

CN    102138027 A    7/2011
CN    103363044 A1   10/2013

(Continued)

OTHER PUBLICATIONS

Chinese Office Action issued in Chinese Patent Application No. 201810148928.2 dated Sep. 25, 2020, with English Translation.

*Primary Examiner* — Michael R Mansen
*Assistant Examiner* — Mark K Buse
(74) *Attorney, Agent, or Firm* — BakerHostetler (57) ABSTRACT

A valve unit for a tensioning device of an endless drive is provided, in particular a chain drive of an internal combustion engine, with a carrier plate having an underside forming a contact surface and an upper side which can be faced towards a pressure chamber of the tensioning device, and a valve body which is guided in a receptacle movably relative to the carrier plate for opening and closing a valve seat of the tensioning device. Such a valve unit is to be simplified and more cost-saving. The receptacle is formed by the carrier plate and a suspension device is provided in the region of the receptacle on which the valve body is suspended from the carrier plate in a lowermost position. The carrier plate is horizontal in the non-installed state of the tensioning device, such that the valve body projects downwardly out of the receptacle and is movable upwardly by at least the opening stroke. The invention relates to a corresponding hydraulic tensioning device.

20 Claims, 6 Drawing Sheets

(58) Field of Classification Search
USPC ............................................. 474/110
See application file for complete search history.

(56) References Cited

U.S. PATENT DOCUMENTS

| | | | | |
|---|---|---|---|---|
| 7,641,575 B2* | 1/2010 | Yoshida | ............... | F16H 7/0848 474/109 |
| 8,574,106 B2 | 11/2013 | Botez | | |
| 9,086,119 B2* | 7/2015 | Kurematsu | ............... | F16H 7/08 |
| 10,221,924 B2* | 3/2019 | Kurematsu | ........... | F16H 7/0848 |
| 2004/0045607 A1 | 3/2004 | Lammers | | |
| 2004/0266572 A1* | 12/2004 | Yoshida | ............... | F16H 7/0848 474/110 |
| 2005/0227799 A1* | 10/2005 | Yoshida | ............... | F16H 7/0848 474/110 |
| 2006/0094549 A1* | 5/2006 | Yoshida | ............... | F16H 7/0836 474/110 |
| 2008/0207365 A1* | 8/2008 | Namie | ................. | F16H 7/0836 474/110 |
| 2008/0261737 A1* | 10/2008 | Yoshida | ............... | F16H 7/0836 474/110 |
| 2008/0318717 A1* | 12/2008 | Kurematsu | ........... | F16H 7/0848 474/110 |
| 2011/0237370 A1* | 9/2011 | Hartmann | ............ | F16H 7/0836 474/110 |
| 2013/0109518 A1* | 5/2013 | Kurematsu | ........... | F16H 7/0848 474/110 |
| 2013/0178317 A1* | 7/2013 | Perissinotto | .......... | F16H 7/0836 474/110 |
| 2013/0260930 A1* | 10/2013 | Kurematsu | ........... | F16H 7/0848 474/110 |
| 2014/0200104 A1* | 7/2014 | Kurematsu | ............... | F16H 7/08 474/110 |
| 2015/0252878 A1* | 9/2015 | Kitano | .................. | F16H 7/1236 474/101 |

FOREIGN PATENT DOCUMENTS

| | | |
|---|---|---|
| CN | 105829763 A | 8/2016 |
| DE | 10 01 071 | 1/1957 |
| DE | 17 61 450 U | 2/1958 |
| DE | 35 20 352 A1 | 12/1986 |
| DE | 196 32 383 A1 | 2/1997 |
| DE | 102 97 397 T5 | 2/2005 |
| DE | 10 2016 120 887 A1 | 1/2017 |
| WO | 2007/149648 A1 | 12/2007 |

* cited by examiner

VALVE UNIT WITH CARRIER PLATE AND VALVE BODY

CROSS-REFERENCE TO RELATED APPLICATION

This application claims priority to foreign German patent application No. DE 10 2017 103 534.6, filed on Feb. 21, 2017, the disclosure of which is incorporated by reference in its entirety.

FIELD OF THE INVENTION

The present invention relates to a valve unit for a tensioning device of a endless drive, in particular a chain drive of an internal combustion engine, with a carrier plate having an underside forming a contact surface and an upper side which can be faced towards a pressure chamber of the tensioning device, and a valve body which is guided in a receptacle movably relative to the carrier plate for opening and closing a valve seat of the tensioning device.

BACKGROUND

Such tensioning devices are used e.g. as a chain tensioner for pressing a tensioning rail, pivotably mounted on the engine block, onto a timing chain. The tensioning device is connected to the engine oil hydraulics and oil is passed via a check valve into a pressure space formed between the housing and a slidably disposed piston. In most cases, the check valves used are valve units which are composed of a valve plate which simultaneously forms the valve seat, a valve cage and a valve body (typically spherical in shape). A valve spring is further optionally inserted between the valve body and the valve cage. The check valves therefore form a unit which is manufactured separately and then inserted into the housing of the tensioning device, in particular pressed thereinto. These valve units are subject to high dynamic loads when used in a chain tensioner. A plurality of rapid opening and closing motions are performed. These valve units are not only subject to these high dynamic loads, but must also be produced inexpensively due to the high cost pressure in the automotive sector. There are numerous efforts in technology in this regard. Valve plates or cages are in part entirely dispensed with, for which reason other components of the tensioning device must fulfill this task (for example, WO 2007/149648 A1 or DE 10297397 T5). A design of a valve unit is known from U.S. Pat. No. 8,574,106 B2, which, however, is not arranged as a check valve in the inlet region of the tensioning device, but as a pressure relief valve at the upper end of the tensioning piston. The upper side of the valve plate is therefore not facing the pressure chamber, but the underside on which the tensioning piston pressure spring is supported. In this variant, the valve cage has been dispensed with. Instead, the valve plate has a tubular extension, at the lower end of which the valve seat is arranged. The spherical valve body can move up and down in this tubular extension. In order to enable a flow-off, a considerable gap must be present between the valve body and the tubular extension so that a proper guidance of the valve body is not given.

SUMMARY OF THE INVENTION

It is therefore the object of the present invention to provide a valve unit of the type mentioned above which can be produced inexpensively.

This object is satisfied by a generic valve unit in that the receptacle is formed by the carrier plate and a suspension device is provided in the region of the receptacle in which the valve body is suspended from the carrier plate in a lowermost position, when the carrier plate is horizontal in the non-installed state of the tensioning device, such that the valve body projects downwardly out of the receptacle and is movable upwardly by at least the opening stroke.

This configuration requires that the valve seat be formed not by the carrier plate itself, but by the housing of the tensioning device or a valve seat insert in the housing of the tensioning device. The carrier plate can be mounted together with the valve body as a unit in the housing. The valve body is quasi secured to the carrier plate by the suspension device. Such securing is in prior art typically effected by a valve cage attached to the front side of the valve plate. In the present invention, it is exactly the opposite, because the valve body is suspended, i.e. is secured to the underside of the carrier plate. Depending on the configuration of the suspension device, the latter can comprise a valve spring which in the lowermost position possibly still exerts a force against a stop of the suspension device. In the simplest embodiment, therefore, the valve unit is composed of only of carrier plate and a valve body, which, however, are captively connected to each other for mounting, whereby costs can be saved.

Due to the fact that the valve seat is not formed by the valve unit itself and possibly for tolerance compensation, it is provided according to one variant that the distance of the lowermost end of the valve body in the lowermost suspended position to the contact surface of the carrier plate is at least equal to, preferably greater than the distance of the lowermost end of the valve body to the contact surface of the carrier plate when the valve unit is installed in the tensioning device and the valve position is closed. This ensures that the valve body presses onto the valve seat at least with its weight or when using a valve spring, that the latter already exerts a certain closing force upon the valve body in the direction of the valve seat. In the non-installed state and in the horizontal position of the carrier plate, the valve body therefore preferably has a lower position than in the installed state. This is a property that no valve unit has in which the valve seat is already part of the valve unit.

Preferably, the receptacle can be arranged centrally on the carrier plate and project downwardly beyond the contact surface of the underside. In this way, a considerable part or the entire valve body can be arranged below the carrier plate, whereby the carrier plate can also be configured to be flat toward the top and the valve unit projects as little as possible or not at all beyond the carrier plate into the pressure chamber.

A particularly simple embodiment is provided when the carrier plate and the valve body are connected to each other by way of a clamp or snap-lock connection formed as part of the suspension device such that the valve body is held in the lowermost position by this clamp or snap-lock connection. Tool-free joining of the valve body and the carrier plate can also be effected by way of a clamp or snap-lock connection with a respective configuration, which is why the valve unit is very easy and inexpensive to produce and without much installation effort.

Conveniently, the receptacle can be configured to be resilient at least in part such that the resilient part engages around a region of the valve body (for forming a snap-lock connection) and thereby form at least part of the suspension device. A spherical valve body can possibly be e.g. clipped into such a receptacle in that the receptacle is simply pressed onto the former. Simple tool-free joining is then possible.

Furthermore, the carrier plate can comprise a central through-flow region, where the receptacle for the valve body is attached within the through-flow region to a spoke-shaped structure. The carrier plate can then be configured as a disk with a uniform thickness, in the center of which the spoke-shaped structure with the receptacle is arranged. The configuration of the spoke-shaped structure can be effected in various ways, as long as sufficient flow through the carrier plate is given for introducing the hydraulic fluid into the pressure chamber. With this structure, it is also not absolutely necessary that a flow-off through the receptacle takes place, but the main portion of the flow-off occurs through the openings of the spoke-shaped structure.

In one advantageous embodiment, it is provided that n spokes of the spoke-shaped structure project into the through-flow region, a partial opening cross-section of the through-flow region is present between each of the spokes, and n is a natural number greater than 1. The spoke-shaped structure must of course be sufficiently stable to ensure guidance of the valve body in the receptacle and possibly also to absorb the respective forces, including that of a valve spring. In order to avoid a suspension of the receptacle being too soft, at least two spokes should be present.

In order for the inflow of the hydraulic fluid into the pressure chamber to be obstructed as little as possible by the valve unit itself and to be as central as possible, it is provided in a further variant that the upper side of the carrier plate is configured to be substantially planar and that no further components of the carrier plate project upwardly beyond the latter, at least within the through-flow region. This means that the receptacle, possibly the spoke-shaped structure and the valve body, are arranged below the upper side of the carrier plate. In many cases, a compression spring is disposed within the pressure chamber between the housing and the tensioning piston. This compression spring can be supported very well on the planar upper side of the carrier plate. In addition, the carrier plate can also serve as an end stop for the tensioning piston. It lends itself to manufacture the carrier plate from a respective material that exhibits sufficient damping properties, in particular, from plastic material or metal that is softer than the material of the tensioning piston and the housing.

The receptacle can preferably comprise a support step, the valve body has a support surface and a valve spring is disposed between the support step and the support surface. This support step can advantageously be configured such that the spring is optionally insertable. If a spherical valve body is used, then the entire surface of the sphere can serve as a support surface when using a helical compression spring as a valve spring, because the valve body can close the valve opening regardless of the position.

If a valve spring is used, then the valve spring is to be regarded as an element of the suspension device. Optionally, the valve spring still exerts force upon the valve body also in the lowermost position. But there is also the option that the valve body is suspended from the valve spring and tensions the latter in the lowermost position due to its weight.

According to one advantageous embodiment, the receptacle can surround the valve body in a sleeve-like manner over at least a circumferential angle of more than 180°, preferably at least 220°, possibly added up, measured perpendicular to the stroke axis of the valve body. This means that the receptacle is not configured to be closed at the circumference and hydraulic fluid can therefore flow out laterally directly below the valve body and does not need to flow through the receptacle itself. For this purpose, the receptacle can be discontinued on the circumference, preferably discontinued at several points. These discontinuations can be assigned to the openings of the spoke-shaped structure, given a corresponding design.

In addition, the wall thickness of the receptacle can decrease towards its lower end, thus forming the resilient portion of the receptacle.

There is additionally the option that the valve body comprises a damping groove. The valve body then does not completely close the valve opening, and hydraulic fluid can still flow via the damping groove out of the pressure chamber through the damping groove, even when the valve body is closed. Other damping structures in the region of the valve body are possible, in particular, the use of several damping grooves.

The costs of the valve unit can be further reduced if, according to a further embodiment, the carrier plate is formed as an off-tool workpiece, is preferably integrally formed. "Off-tool workpiece" is presently understood to mean a carrier plate which is created by a tool specially adapted for it. The forming operation is preferably performed in a non-cutting manner, e.g. by injection molding, sintering, press-molding, MIM (metal injection molding), etc. punching steps can be provided in a tool specially made for this. However, this does not include machining centers or cutting tools that can be used to fabricate workpieces of various kinds.

Furthermore, the invention relates to a hydraulic tensioning device for an endless drive, in particular a chain drive of an internal combustion engine, comprising a housing, a piston displaceably guided in the housing, a pressure chamber formed between the piston and the housing, and a check valve arranged in the inlet region of the pressure chamber. The hydraulic tensioning device is characterized in that the check valve comprises a valve seat formed by the housing or by an insert disposed in the housing and a valve unit inserted into the housing according to one of the claims 1 to 14, where the valve seat is disposed at a predetermined distance below the contact surface of the carrier plate. The valve seat is preferably recessed in a blind bore disposed at the lower end of the pressure chamber. The bottom of the pressure chamber can then serve as a contact surface for the contact surface of the carrier plate, while the receptacle and the valve body extend into the blind bore. This allows for a very simple configuration of the check valve. The fabrication of the housing requires a cutting operation anyway, for which reason the arrangement of the blind bore of the valve seat can be produced in one clamping with the piston bore. In addition, the configuration of the valve unit enables a flexible configuration and ease of assembly, resulting in cost advantages. In prior art, the assembly of check valves is often very expensive because e.g. welding, flanging, etc. is typically necessary. The valve unit according to the invention can be configured very easily (with/without valve spring, ball/closing piston).

BRIEF DESCRIPTION OF THE DRAWINGS

Embodiments of the present invention are explained in more detail below with reference to drawings, where.

DETAILED DESCRIPTION

Figure 1:
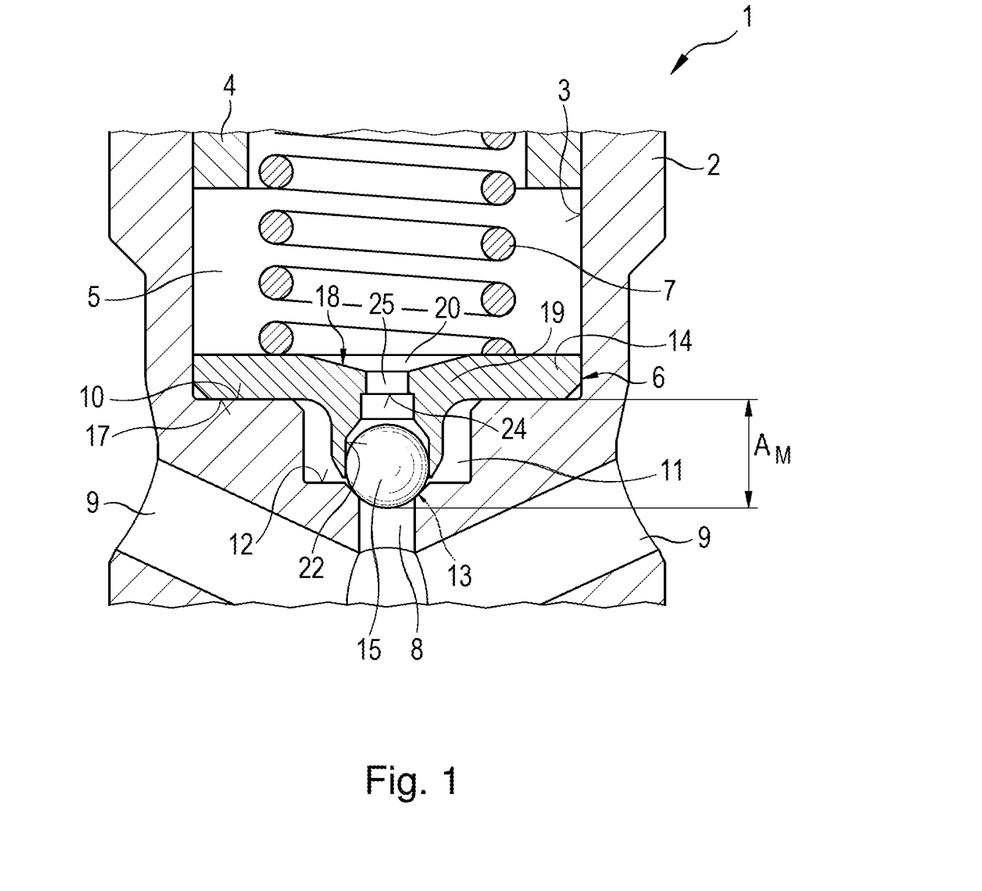
FIG. 1 shows a partial section view of a hydraulic tensioning device according to the invention.

The present tensioning device 1 is a screw-in chain tensioner for a timing chain drive of an internal combustion engine, the configuration of which is essentially known, for which reason only the components essential to the invention shall be discussed hereafter. Tensioning device 1 comprises a housing 2 with a cylindrical housing bore 3 and a tensioning piston 4 which is guided longitudinally movably in housing bore 3. A pressure chamber 5 for hydraulic fluid is formed between housing bore 3 and tensioning piston 4. A valve unit 6 is arranged at the lower end of pressure chamber 5. A helical compression spring 7 is arranged between valve unit 6 and the back side of tensioning piston 4. Housing 2 comprises a hydraulic fluid inlet 8 which is in communication with the engine oil hydraulic system via supply channels 9. At base 10 of housing bore 3, a blind bore 11 is formed as a recess at the bottom 12 of which valve seat 13 is arranged. Valve seat 13 is formed by the transition of inlet 8 and bottom 12 of blind bore 11 and is therefore part of housing 2. In order to reinforce valve seat 13, housing 2 can be heat treated in this region (e.g. inductive hardening) or compacted (e.g. shot peening). Alternatively, an insert can be provided at that location and form the valve seat. Such an insert, however, is then not connected to the rest of valve unit 6 to form its own assembly unit.

In the present embodiment, valve unit 6 is composed of two components. These are, firstly, carrier plate 14 and, secondly, valve body 15 formed as a sphere. Carrier plate 14 is manufactured as an off-tool component and in the present case by metal injection molding. Carrier plate 14 has a planar upper side 16 on which helical compression spring 7 is supported, and a planar contact surface 17 on its underside with which carrier plate 14 rests on base 10 of housing bore 3. The outer diameter of carrier plate 14 substantially corresponds to the diameter of housing bore 3. Carrier plate 14 is preferably inserted with play and held in position only by helical compression spring 7. It can alternatively be pressed in.

Figure 3:
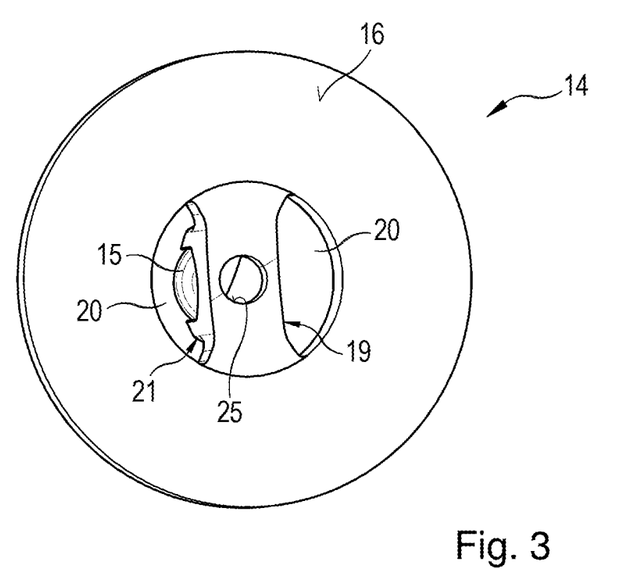
FIG. 3 shows the valve unit from FIG. 2 in a perspective top view.
Figure 4:
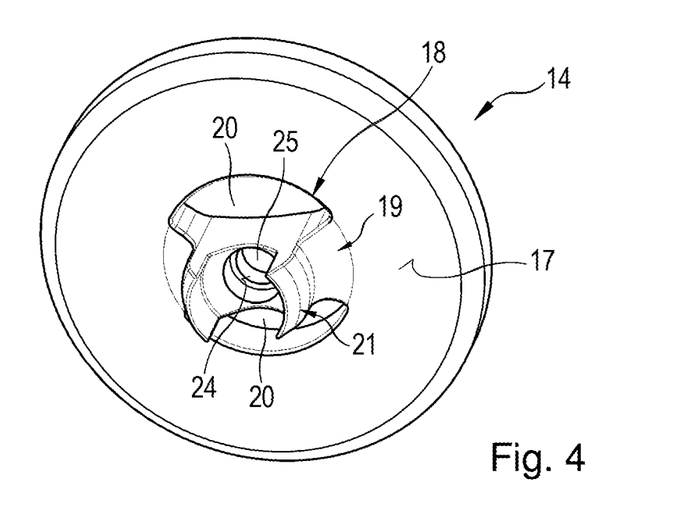
FIG. 4 shows the carrier plate of the valve unit from FIG. 2 in a reduced perspective view.

Carrier plate 14 comprises at its center (see also FIGS. 2 to 4) a passage region 18, the shape of which is substantially circular, and in the center of which a spoke-shaped structure with two spokes is arranged. A passage opening 20 is disposed on both sides of spoke-shaped structure 19. Spoke-shaped structure 19 or the spokes extend obliquely downwardly, starting from upper side 16 to the center, and on their front side carries/carry a sleeve-shaped receptacle 21 with two open sides which are aligned flush with passage openings 20. As a result, however, sleeve-shaped receptacle 21 is still closed over a larger area than 180° on the circumference, so that secure reception and guiding of valve body 15 is ensured. Receptacle 21 comprises a guide opening 22 for guiding the valve body 15 which is dimensioned such that valve body 15 can be moved up and down therein with only little play. The lower end of receptacle 21 has a tapering wall thickness and ends that are bent inwardly, so that valve body 15 is retained in a lowermost position and can not drop out of receptacle 21. The lowermost position is occupied by valve body 15 when carrier plate 14 is in a horizontal position (upper side 16 upwards) and valve body 15 drops to its lowest position in receptacle 21 due to gravity. Valve body 15 is quasi suspended from carrier plate 14, for which reason receptacle 21 thus formed with spoke-shaped structure 19 can also be referred to as a suspension device. This lowermost position of valve body 15 can only be assumed in the non-installed state of valve unit 6. In the position shown in FIG. 1, valve body 15 no longer abuts against the front end of receptacle 21, but rests on valve seat 13. Therefore, the distance, which is occupied by the lowermost end of valve body 15 in the lowermost position, to contact surface 17 is greater than the distance $A_M$ in the installed state.

Figure 2:
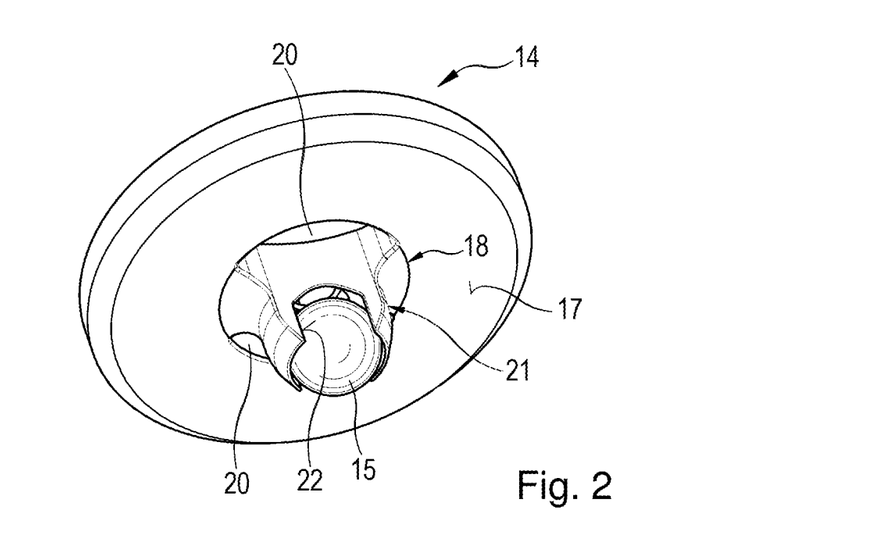
FIG. 2 shows the valve unit from FIG. 1 in an enlarged perspective bottom view.

The resilience of the front end of receptacle 21 is dimensioned such that valve body 15 can be clipped from the front into receptacle 21 in that carrier plate 14 is pressed thereonto. Dropping out by itself can then not occur. For this purpose, the front distance of the ends of receptacle 21 is slightly smaller than the diameter of valve body 15. Due to the open sleeve shape of receptacle 21 and the tapered wall thickness, however, sufficient resilience of receptacle 21 is given for this joining operation and a snap-lock connection is thus provided.

At its upper end, guide opening 22 of receptacle 21 tapers to the shape of a truncated cone, so that a stop surface for valve body 15 is formed. Located thereabove is a support step 24 with an adjoining central opening 25.

Valve body 15 can now perform its opening stroke upwards within receptacle 21 until it impacts. Both receptacle 21 and valve body 15 are arranged entirely below contact surface 17 in this embodiment and therefore positioned entirely within blind bore 11 in the assembled state.

The mode of action and operation of the embodiment described above shall be explained in more detail below.

Valve unit 6 can be manufactured and joined in a very simple manner without the need for special joining methods, such as welding, flanging, etc. Valve body 15 can be inserted into carrier plate 14 without tools with a little pressure in that the side portions of receptacle 21 spread open and spring back around valve body 15. Guide opening 22 is dimensioned such that valve body 15 can move up and down in guide opening 22 within the receptacle. Only in its lowermost suspended position does it contact the front end of receptacle 21, whereby a drop-out protection is effected by way of the suspension device thus formed. Valve unit 6 is inserted into housing 2 in the correct orientation. The position of valve seat 13 is dimensioned such that the valve body is slightly raised when contact surface 17 rests on base 10. If hydraulic fluid is now to flow via supply channels 9 and inlet 8 into pressure chamber 5, then valve body 15 moves upward and hydraulic fluid can flow out from inlet 8 below valve body 15, then flow into blind bore 11 and along the outside of receptacle 21 and through passage openings 20 into pressure chamber 5. A very inexpensive and extremely robust check valve is created due to the simplicity of the design of valve unit 6.

Figure 5:
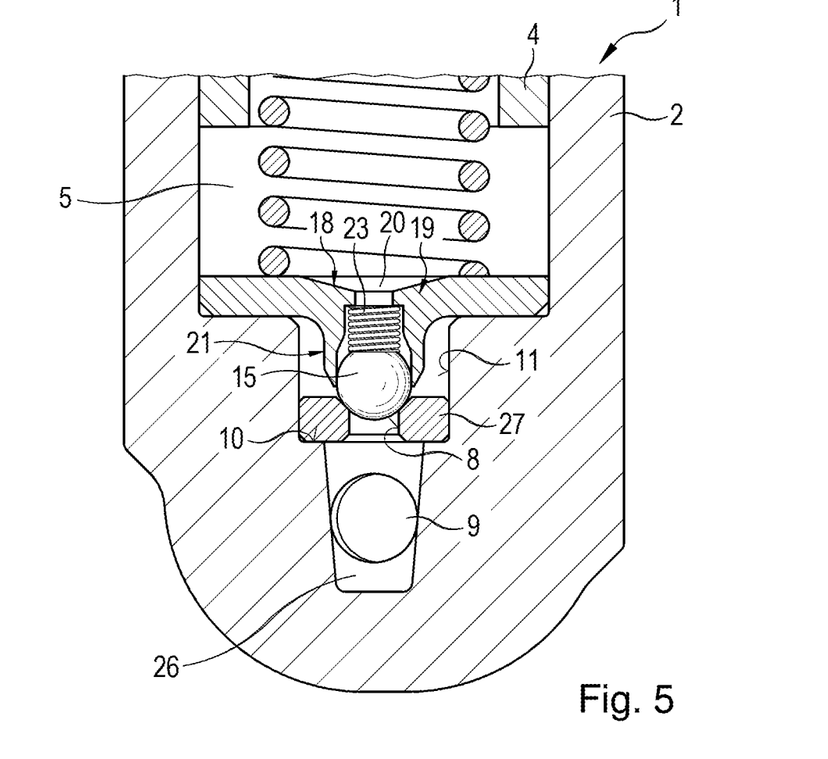
FIG. 5 shows a partial section view of a second embodiment of a hydraulic tensioning device according to the invention.
Figure 6:
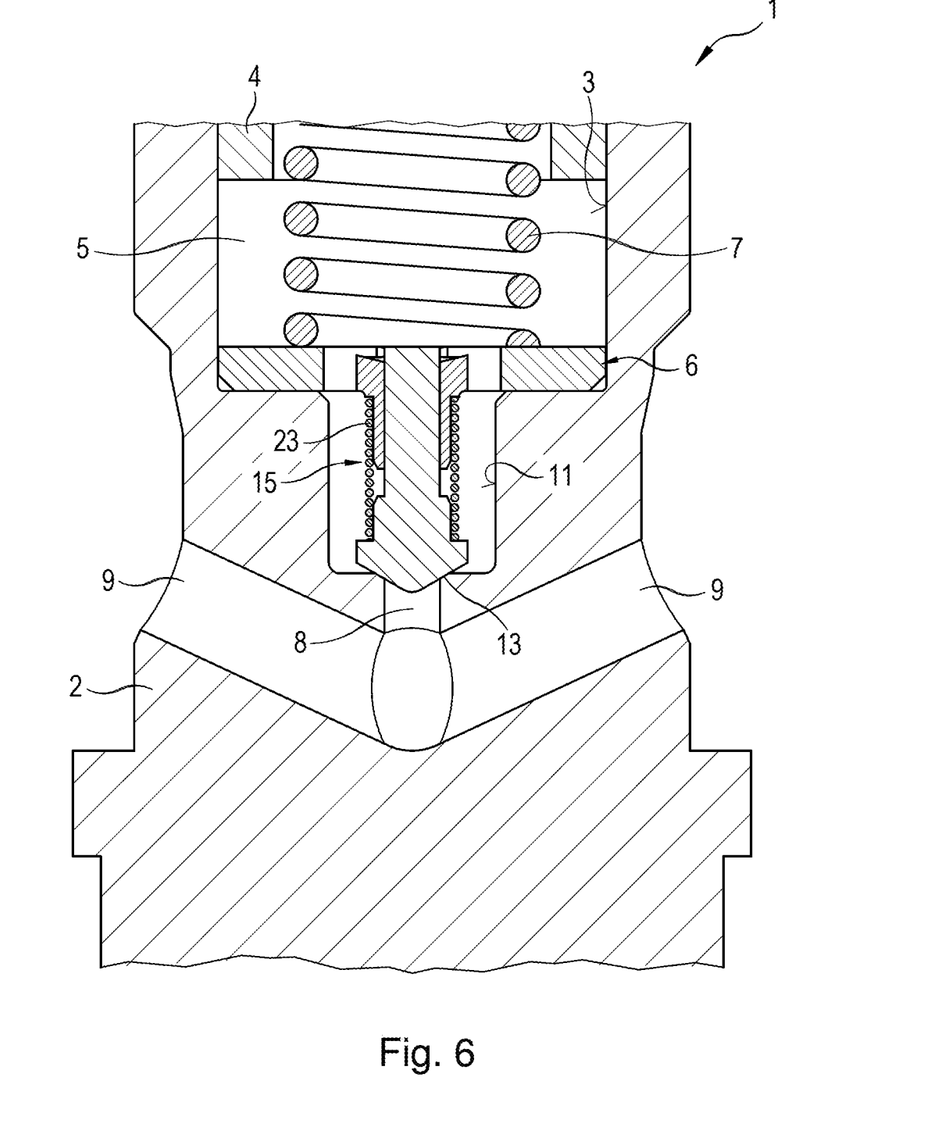
FIG. 6 shows a partial section view of a third embodiment of a hydraulic tensioning device according to the invention.
Figure 7:
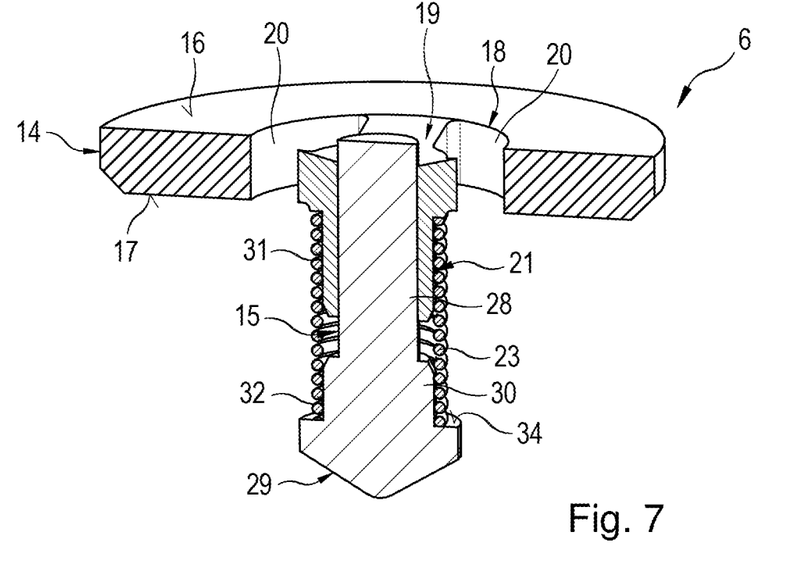
FIG. 7 shows the valve unit from FIG. 6 in an enlarged perspective full section view.
Figure 8:
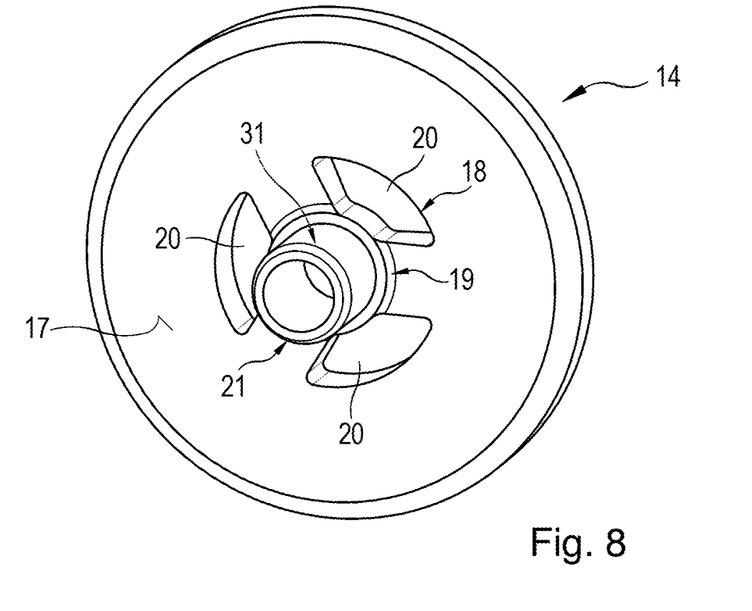
FIG. 8 shows the carrier plate from FIG. 7 in a reduced perspective bottom view.

A second embodiment shall now be explained in more detail below with reference to FIG. 5. Only the essential differences shall be explained, for which reason reference is made to the above description by using the same reference numerals.

In the present case, housing 2 is configured not as a screw-in housing but as a flange housing and has a supply channel 9 only on one side which opens into a central supply chamber 26. Valve seat 13 in this embodiment is formed by a valve seat insert 27 which is seated on bottom 12 of blind bore 11 and is pressed into blind bore 11. Valve seat insert 27 is symmetrical, so that it can also be pressed in exactly front-to-back. Valve seat insert 27 is a component having a higher strength and is e.g. hardened.

Carrier plate 14 and valve body 15 are structured identically to the previous embodiment. However, a valve spring 23 is arranged within support step 24. This valve spring 23 is part of the suspension device, so that valve body 15 is in its lowermost position (in the uninstalled state) pressed against the front ends of receptacle 21; but with a force that is insufficient to push valve body 15 out of receptacle 21. Inlet 8 is formed in correspondence to valve insert 27. The mode of action and operation of these embodiments are otherwise identical, except for the action of valve spring 23.

It is evident from this embodiment that carrier plate 14 can be used universally and that valve spring 23 can be used optionally.

A third embodiment of the present invention shall now be explained in more detail with reference to FIGS. 6 to 9. Only the essential differences shall likewise be explained below, for which reason reference is additionally made to the above description by using the same reference numerals.

Also in the present case, housing 2 is designed as a screw-in housing. Carrier plate 14 now has a spoke-shaped structure 19 with three spokes and three intermediate openings 20 disposed therebetween. Receptacle 21 is closed and configured to be sleeve-shaped and it has no front resilient end portions engaging around valve body 15. Valve body 15 is now configured as a valve push rod, the rear cylindrical end 28 of which is guided in guide opening 22 of receptacle 21. Provided at the front end is a cone-shaped valve head 29 which in the installed state presses onto valve seat 13. The back side of valve head 29 is provided with a cylindrical extension 30 which has a larger diameter than cylindrical end 28 and serves as a front-side stop on receptacle 21 for limiting the opening stroke. An associated end of valve spring 23 is respectively clamped on cylindrical outer surface 31 of receptacle 21 and the approximately equally sized cylindrical outer surface 32 of cylindrical extension 30. As a result, valve body 15 is suspended on valve spring 23 in a lowermost suspended position while carrier plate 14 is in the horizontal position (upper side 16 upwardly). Valve body 15 there again assumes a position which is lower relative to carrier plate 14 than in the installed state. However, the resilience is relatively high in relation to the weight of valve body 15, for which reason valve spring 23 is in the installed state already compressed due to the installation stroke of valve body 15 and works as a compression spring.

Figure 9:
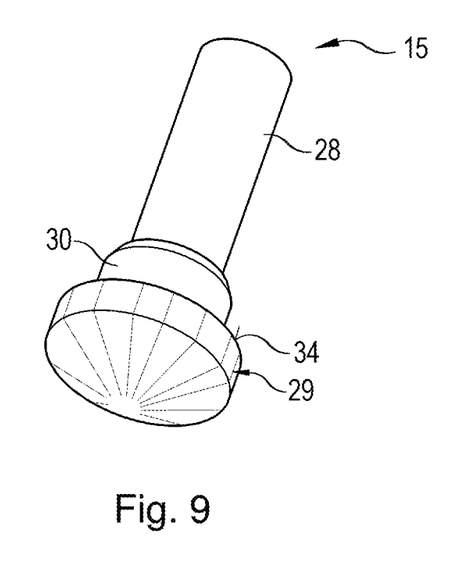
FIG. 9 shows a first embodiment of the valve body from FIG. 7 in a perspective bottom view.

In this version, valve body 15 is configured such that valve head 29 is seated on valve seat 13 over the entire surface and in the closed position also completely closes it.

Figure 10:
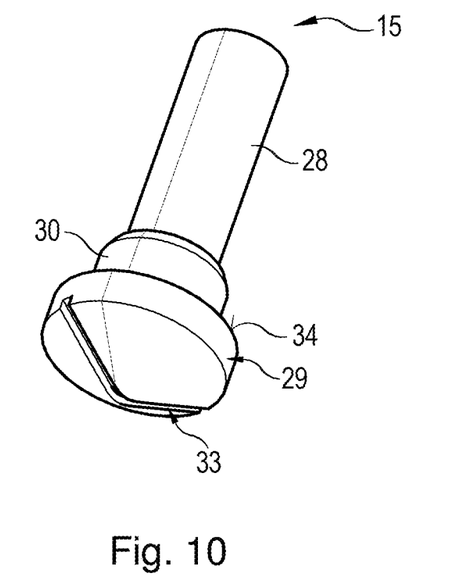
FIG. 10 shows a second embodiment of the valve body from FIG. 7 in a perspective bottom view.

Alternatively, valve body 15 can also be configured as shown in FIG. 10. The latter then comprises a continuous damping groove 33 at the front side of its valve head 29 which still allows for a leakage flow of the hydraulic fluid out of pressure chamber 5 and thus for damping when the check valve is closed. In many cases, damping in such tensioning devices 1 is effected by an annular leakage gap between tensioning piston 4 and housing bore 3. This leakage gap can be markedly reduced where a damping groove 33 also assumes the damping function. This makes it possible to effect better guidance of tensioning piston 4 in housing bore 3.

LIST OF REFERENCE NUMERALS

1 tensioning device
2 housing
3 housing bore
4 tensioning piston
5 pressure chamber
6 valve unit
7 helical compression spring
8 inlet
9 supply channel
10 base
11 blind bore
12 bottom
13 valve seat
14 carrier plate
15 valve body
16 upper side
17 contact surface
18 through-flow region
19 storage-shaped [sic] structure
20 passage opening
21 receptacle
22 guide opening
23 valve spring
24 support step
25 opening
26 supply chamber
27 valve seat insert
28 cylindrical end
29 valve head
30 cylindrical extension
31 cylindrical outer surface
32 cylindrical outer surface
33 damping groove
34 support surface

The invention claimed is:

1. A valve unit for a tensioning device of an endless drive, with a carrier plate having an underside forming a contact surface and an upper side which can be faced towards a pressure chamber of said tensioning device, and a valve body which is guided in a receptacle movably relative to said carrier plate for opening and closing a valve seat of said tensioning device, wherein said receptacle is formed by said carrier plate and a suspension device is provided in the region of said receptacle on which said valve body is suspended from said carrier plate in a lowermost position, when said carrier plate is horizontal in the non-installed state of said tensioning device, such that said valve body projects downwardly out of said receptacle and is movable upwardly by at least the opening stroke, wherein a distance of the lowermost end of said valve body in the lowermost suspended position to said contact surface of said carrier plate is greater than a distance ($A_M$) of said lowermost end of said valve body to said contact surface of said carrier plate when said valve unit is installed in said tensioning device and the valve position is closed.

2. The valve unit according to claim 1, wherein said receptacle is arranged centrally on said carrier plate and projects downwardly beyond said contact surface of the underside.

3. The valve unit according to claim 1, wherein said carrier plate and said valve body are connected to each other by way of a snap-lock connection formed as part of said suspension device such that said valve body is held in the lowermost position by said snap-lock connection.

4. The valve unit according to claim 1, wherein said receptacle is configured to be resilient at least in part such that the resilient part engages around a region of said valve body and thereby forms part of the suspension device.

5. The valve unit according to claim 4, wherein a wall thickness of said receptacle decreases toward its lower end, thus forming the resilient part of said receptacle.

6. The valve unit according to claim 1, wherein said carrier plate comprises a central through-flow region, and said receptacle for said valve body is attached within said through-flow region to a spoke-shaped structure.

7. The valve unit according to claim 6, wherein n spokes of said spoke-shaped structure project into said through-flow region, a partial opening cross-section of said through-flow region is present between each of the spokes, and n is a natural number greater than 1.

8. The valve unit according to claim 6, wherein said upper side of said carrier plate is configured to be substantially planar and no further components of said carrier plate project upwardly beyond the latter, at least within said through-flow region.

9. The valve unit according to claim 1, wherein said receptacle comprises a support step, said valve body has a support surface, and a valve spring is disposed between said support step and said support surface.

10. The valve unit according to claim 1, wherein a valve spring is an element of said suspension device.

11. The valve unit according to claim 1, wherein said receptacle surrounds said valve body in a sleeve-like manner over at least a circumferential angle perpendicular to a stroke axis of said valve body of more than 180°, possibly added up.

12. The valve unit according to claim 1, wherein said valve body comprises a damping groove.

13. The valve unit according to claim 1, wherein said carrier plate is formed as an off-tool workpiece.

14. A hydraulic tensioning device for an endless drive, with a housing, a tensioning piston displaceably guided in said housing, a pressure chamber formed between said tensioning piston and said housing, and a check valve arranged in the inlet region of said pressure chamber, wherein said check valve comprises a valve seat formed by said housing or by an insert disposed in said housing and a valve unit inserted into said housing according to claim 1, where said valve seat is disposed at a predetermined distance below said contact surface of said carrier plate.

15. The hydraulic tensioning device according to claim 14, wherein the hydraulic tensioning device is for a chain drive of an internal combustion engine.

16. The valve unit according to claim 1, wherein the valve unit is for a chain drive of an internal combustion engine.

17. The valve unit according to claim 1, wherein said receptacle surrounds said valve body in a sleeve-like manner over at least a circumferential angle perpendicular to a stroke axis of said valve body of at least 220°, possibly added up.

18. The valve unit according to claim 1, wherein said carrier plate is formed as a one-piece off-tool workpiece.

19. A valve unit for a tensioning device of an endless drive, with a carrier plate having an underside forming a contact surface and an upper side which can be faced towards a pressure chamber of said tensioning device, and a valve body which is guided in a receptacle movably relative to said carrier plate for opening and closing a valve seat of said tensioning device, wherein said receptacle is formed by said carrier plate and a suspension device is provided in the region of said receptacle on which said valve body is suspended from said carrier plate in a lowermost position, when said carrier plate is horizontal in the non-installed state of said tensioning device, such that said valve body projects downwardly out of said receptacle and is movable upwardly by at least the opening stroke, wherein said receptacle is configured to be resilient at least in part such that the resilient part engages around a region of said valve body and thereby forms part of the suspension device, and wherein a wall thickness of said receptacle decreases toward its lower end, thus forming the resilient part of said receptacle.

20. A valve unit for a tensioning device of an endless drive, with a carrier plate having an underside forming a contact surface and an upper side which can be faced towards a pressure chamber of said tensioning device, and a valve body which is guided in a receptacle movably relative to said carrier plate for opening and closing a valve seat of said tensioning device, wherein said receptacle is formed by said carrier plate and a suspension device is provided in the region of said receptacle on which said valve body is suspended from said carrier plate in a lowermost position, when said carrier plate is horizontal in the non-installed state of said tensioning device, such that said valve body projects downwardly out of said receptacle and is movable upwardly by at least the opening stroke, wherein a valve spring is an element of said suspension device.

* * * * *